(12) United States Patent
Jang et al.

(10) Patent No.: US 7,542,109 B2
(45) Date of Patent: Jun. 2, 2009

(54) LCD DEVICE AND METHOD FOR SWITCHING BETWEEN WIDE AND NARROW VIEWING ANGLE DISPLAY MODES HAVING VIEWING ANGLE CONTROL CELL DISPOSED ADJACENT LCD PANEL

(75) Inventors: Hyung-Seok Jang, Gyeonggi-Do (KR); Hyun-Suk Jin, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 504 days.

(21) Appl. No.: 11/318,640

(22) Filed: Dec. 28, 2005

(65) Prior Publication Data
US 2007/0002220 A1   Jan. 4, 2007

(30) Foreign Application Priority Data
Jun. 30, 2005   (KR) ............... 10-2005-0058941

(51) Int. Cl.
*G02F 1/1347* (2006.01)
(52) U.S. Cl. .................... 349/77; 349/64; 349/74; 349/82
(58) Field of Classification Search ............ 349/64, 349/74–83
See application file for complete search history.

(56) References Cited

U.S. PATENT DOCUMENTS

| | | | | |
|---|---|---|---|---|
| 5,777,588 A | * | 7/1998 | Woodgate et al. | 345/6 |
| 6,191,833 B1 | * | 2/2001 | Hirakata | 349/61 |
| 7,068,336 B2 | * | 6/2006 | Oh et al. | 349/123 |
| 2007/0058135 A1 | * | 3/2007 | Morikawa et al. | 353/30 |

\* cited by examiner

*Primary Examiner*—David Nelms
*Assistant Examiner*—John Heyman
(74) *Attorney, Agent, or Firm*—Morgan Lewis & Bockius LLP

(57) ABSTRACT

A liquid crystal display (LCD) device is switchable between a wide viewing angle display mode and a narrow viewing angle display mode. The LCD device includes and LCD panel having an array substrate, a color filter substrate, and a liquid crystal layer disposed between the array substrate and the color filter substrate and a viewing angle control cell disposed adjacent to the LCD panel. The viewing angle control cell has first and second substrates, first and second electrodes disposed between the first and second substrates, an insulating layer disposed between the first and second electrodes, and a sheet layer having pigments disposed between the first and second substrates.

18 Claims, 4 Drawing Sheets

LCD DEVICE AND METHOD FOR SWITCHING BETWEEN WIDE AND NARROW VIEWING ANGLE DISPLAY MODES HAVING VIEWING ANGLE CONTROL CELL DISPOSED ADJACENT LCD PANEL

This application claims the benefit of Korean Patent Application No. 58941/2005 filed in Korea on Jun. 30, 2005, which is hereby incorporated by reference.

BACKGROUND OF THE INVENTION

1. Field of the Invention

The present invention relates to a liquid crystal display (LCD) device and a method for fabricating the same, and more particularly, to an LCD device for switching between a wide viewing angle display mode and a narrow viewing angle display mode and a method for fabricating the same.

2. Description of the Related Art

For a flat panel display device with a high picture quality and low consumption power, liquid crystal display (LCD) devices are being increasingly used. LCD devices control an optical transmittance using a liquid crystal layer interposed between two substrates and by controlling an intensity of an electric field applied to an electrode formed at the substrate. LCD devices are being widely used in notebook computers, personal digital assistants (PDAs), video telephones, televisions, and various portable electronic devices.

According to a user's various demands, an LCD device having a large screen, a fine pitch, and a wide viewing angle is being developed. LCD devices having a wide viewing angle include an LCD device using a horizontal field driving method, and an LCD device having a compensating film using a vertical alignment (VA) method.

In the LCD device using the horizontal field driving method, a pixel electrode and a common electrode are formed on the same substrate such that an electric field horizontal to the substrate is formed between the pixel electrode and the common electrode when the pixel electrode is turned on. Accordingly, a long axis of liquid crystal molecules is operated in parallel with the substrate according to the pixel electrode being switched on or off. As a result, a refractive index of the liquid crystal observed by the user's eyes is small, thereby providing an excellent contrast ratio and wide viewing angle.

By comparison, an LCD device using the vertical alignment (VA) method implements a viewing angle by attaching a compensation film at an inner side of a polarizing plate. The LCD device using the vertical alignment (VA) method comprises a pair of transparent substrates having a transparent electrode at an inner surface thereof, a liquid crystal material injected between the two substrates and aligned to be perpendicular to the substrate, and a pair of polarizing plates perpendicularly attached to an outer surface of each transparent substrate for polarizing light. Recently, a mode in which liquid crystal molecules are divided by forming an opening pattern or a protrusion on a transparent electrode without performing a rubbing has been proposed.

A general LCD device for implementing a viewing angle will be explained with reference to FIG. 1. FIG. 1 is a sectional view schematically showing a liquid crystal display (LCD) device in accordance with the related art.

As shown, a general LCD device comprises a thin film transistor (TFT) array substrate 11, a color filter substrate 41 facing and attached to the TFT array substrate 11 with a uniform gap, and a liquid crystal layer 51 disposed between the TFT array substrate 11 and the color filter substrate 41. On the TFT array substrate 11, pixels are arranged in a matrix form. A thin film transistor 20, a pixel electrode 27, and a capacitor (not shown) are formed at each unit pixel. The thin film transistor 20 comprises a gate electrode 13 formed on the TFT array substrate 11, a gate insulating layer 15 formed on the TFT array substrate 11 including the gate electrode 13, a semiconductor layer 17, and source/drain electrodes 21 and 23 formed on the semiconductor layer 17 and spaced from each other with a certain gap. The pixel electrode 27 is electrically connected to the drain electrode 23 through a drain contact hole (not shown) formed in a passivation layer 25 formed on an entire surface of the TFT array substrate 11 having the source/drain electrodes 21 and 23. On the color filter substrate 41, a common electrode 47 for applying an electric field through the liquid crystal layer 51 to the pixel electrode 27 of the TFT array substrate 11, R, G, and B color filters 45 for implementing color, and a black matrix 43 are formed. An alignment layer (not shown) is formed at the inside surfaces of the TFT array substrate 11 and the color filter substrate 41. Also, liquid crystal is arranged on a surface of the alignment layer (not shown) in a certain direction determined by a rubbing direction of the alignment layer.

The liquid crystal is rotated by dielectric anisotropy when an electric field is applied between the pixel electrode 27 formed at each pixel of the TFT array substrate 11 and the common electrode 47 formed at the front surface of the color filter substrate 41. Accordingly, images are displayed by passing light through each pixel or by preventing light from being transmitted through each pixel.

The color filter substrate 41 and the TFT array substrate 11 are respectively provided with a first polarizing plate 61 and a second polarizing plate 63. The polarizing plates 61 and 63 polarize natural light incident with vibration in several directions into one direction (that is, polarization).

In the LCD device, light 71 from a backlight is emitted to a front surface of an LCD panel, and the light passes through several diffusion sheets (not shown) to obtain a uniform brightness. As the light is incident on the front surface of the LCD panel, an image can be displayed in a wide viewing angle.

The general LCD device being developed generally has a wide viewing angle. However, in specific cases, the LCD device is desired to have a narrow viewing angle.

The related art LCD device has a number of problems. For example, even if an image can be displayed in a wide viewing angle using light incident on the front surface of the LCD panel, a narrow viewing angle and a wide viewing angle cannot be actively controlled. Although not shown, a viewing angle can be narrowed by applying a film-type filter or an optical fiber to the LCD panel. However, a display mode cannot be switched between a wide viewing angle and a narrow viewing angle, and a brightness of the front surface of the LCD panel is drastically decreased.

SUMMARY OF THE INVENTION

Accordingly, the present invention is directed to a LCD device for switching between wide viewing angle display mode and narrow viewing angle display mode and method for fabricating the same that substantially obviates one or more of the problems due to limitations and disadvantages of the related art.

An object of the present invention is to provide a liquid crystal display (LCD) device for switching between a wide viewing angle display mode and a narrow viewing angle display mode.

To achieve these and other advantages and in accordance with the purpose of the present invention, as embodied and broadly described, a liquid crystal display (LCD) device for switching between a wide viewing angle display mode and a narrow viewing angle display mode comprises an LCD panel including an array substrate, a color filter substrate, and a liquid crystal layer disposed between the array substrate and the color filter substrate; and a viewing angle control cell disposed adjacent to the LCD panel, the viewing angle control cell including first and second substrates, first and second electrodes disposed between the first and second substrates, an insulating layer disposed between the first and second electrodes, and a sheet layer having pigments disposed between the first and second substrates.

In another aspect, a method for fabricating a liquid crystal display (LCD) device for switching between a wide viewing angle display mode and a narrow viewing angle display mode, comprises forming an LCD panel including an array substrate, a color filter substrate, and a liquid crystal layer between the array substrate and the color filter substrate; and forming a viewing angle control cell disposed adjacent to the LCD panel, the viewing angle control cell including first and second substrates, first and second electrodes disposed between the first and second substrates, an insulating layer disposed between the first and second electrodes, and a sheet layer having pigments disposed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

A liquid crystal display (LCD) device for switching between a wide viewing angle display mode and a narrow viewing angle display mode according to exemplary embodiments of the present invention will be explained with reference to FIGS. 2 to 8.

Figure 1:
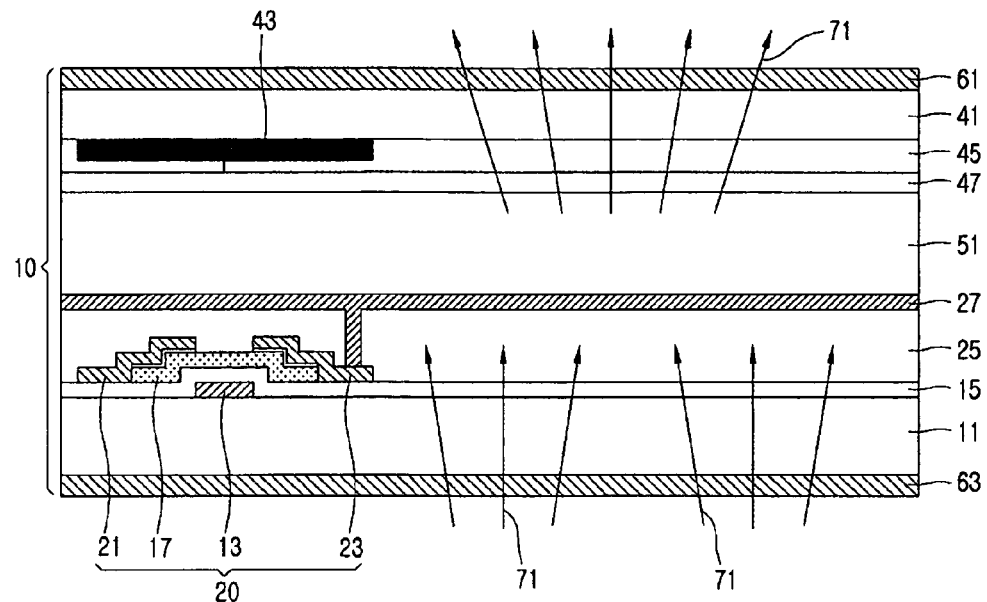
FIG. 1 is a sectional view schematically showing a liquid crystal display (LCD) device in accordance with the related art.
Figure 2:
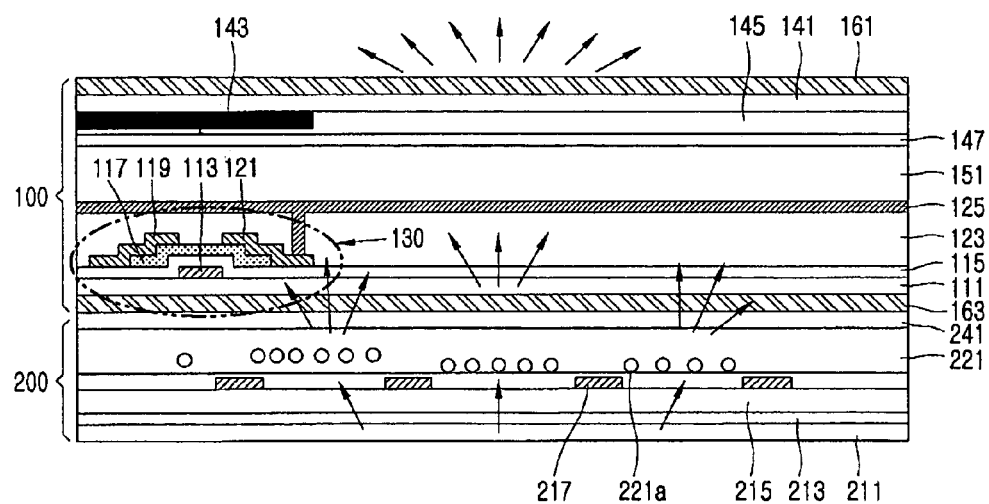
FIG. 2 is a sectional view showing an LCD device for implementing a wide viewing angle when a signal is not applied to a viewing angle control cell using white pigments in an LCD device for switching between a wide viewing angle display mode and a narrow viewing angle display mode according to a first exemplary embodiment of the present invention.
Figure 3:
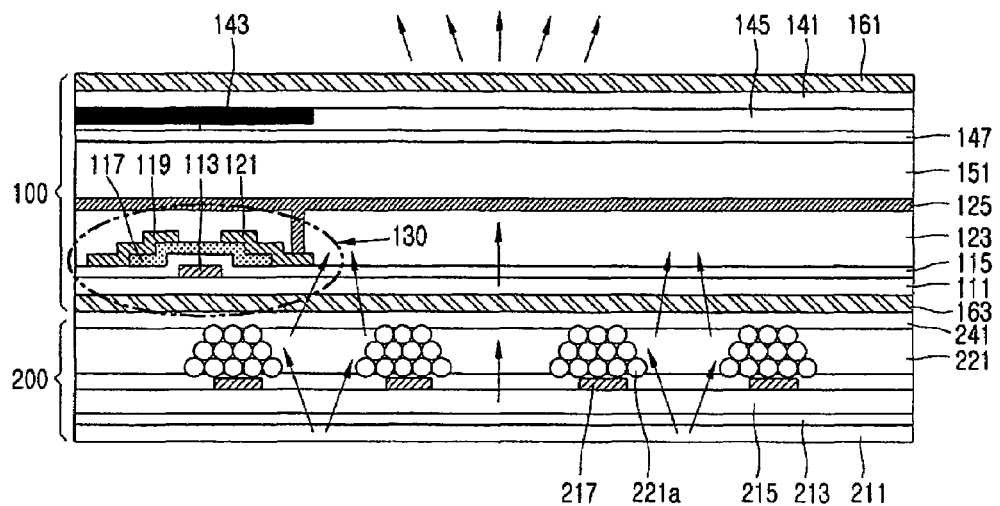
FIG. 3 is a sectional view showing an LCD device for implementing a narrow viewing angle when a signal is applied to a viewing angle control cell using white pigments in the LCD device for switching between a wide viewing angle display mode and a narrow viewing angle display mode according to the first exemplary embodiment of the present invention.

FIG. 2 is a sectional view showing an LCD device for implementing a wide viewing angle when a signal is not applied to a viewing angle control cell using white pigments in an LCD device for switching between a wide viewing angle display mode and a narrow viewing angle display mode according to a first embodiment of the present invention. FIG. 3 is a sectional view showing an LCD device for implementing a narrow viewing angle when a signal is applied to a viewing angle control cell using white pigments in the LCD device for switching between a wide viewing angle display mode and a narrow viewing angle display mode according to the first embodiment of the present invention.

As shown in FIG. 2, a liquid crystal display (LCD) device for switching between a wide viewing angle display mode and a narrow viewing angle display mode comprises a backlight (not shown), a viewing angle control cell 200 disposed on the backlight, and an LCD panel 100 of a wide viewing angle mode disposed on the viewing angle control cell 200. Alternatively, the viewing angle control cell 200 can be disposed on the LCD panel 100.

The viewing angle control cell 200 comprises a lower substrate 211, a first electrode 213 formed on substantially an entire surface of the lower substrate 211, an insulating layer 215 formed on the first electrode 213, a second electrode 217 formed on the insulating layer 215, an upper substrate 241 spaced from the lower substrate 211 with a certain gap, and a sheet layer 221 having a plurality of white pigments between the lower substrate 211 and the upper substrate 241. The pigments of the viewing angle control cell 200 are easily aligned in one direction according to polarities of applied voltages, that is, negative voltages and positive voltages. The pigments are not changed due to a bi-stable characteristic thereof after they are moved when a voltage is applied to the viewing angle control cell 200. That is, the pigments are densely arranged at one electrode until a next signal is applied to the viewing angle control cell 200.

The LCD panel of a wide viewing angle comprises a thin film transistor (TFT) array substrate 111, a color filter substrate 141 facing and attached to the TFT array substrate 111 with a uniform gap, and a liquid crystal layer 151 formed between the TFT array substrate 111 and the color filter substrate 141.

On the TFT array substrate 111, pixels are arranged in a matrix form. A thin film transistor 130, a pixel electrode 125, and a capacitor (not shown) are formed at each unit pixel. The thin film transistor 130 comprises a gate electrode 113 formed on the TFT array substrate 111, a gate insulating layer 115 formed on the TFT array substrate 111 including the gate electrode 113, a semiconductor layer 117, and source/drain electrodes 119 and 121 formed on the semiconductor layer 117 and spaced from each other with a certain gap. The pixel electrode 127 is electrically connected to the drain electrode 123 through a drain contact hole (not shown) formed in a passivation layer 123 formed on an entire surface of the TFT array substrate 111 including the source/drain electrodes 119 and 121. On the color filter substrate 141, in one exemplary configuration, a common electrode 147 (for applying an electric field through the liquid crystal layer 151 to the pixel electrode 125), R, G, and B color filters 145 (for implementing color), and a black matrix 143 are formed.

An alignment layer (not shown) is formed at inside surfaces of each of the TFT array substrate 111 and the color filter substrate 141. Also, liquid crystal is arranged on a surface of the alignment layer (not shown) in a certain direction determined by a rubbing direction. The liquid crystal is rotated by dielectric anisotropy when an electric field is applied between the pixel electrode 125 formed at each pixel of the TFT array substrate 111 and the common electrode 147 formed at the entire surface of the color filter substrate 141. Accordingly, images are displayed by transmitted light through specific pixels or by preventing light from being transmitted through other pixels.

The color filter substrate 141 and the TFT array substrate 111 are respectively provided with a first polarizing plate 161 and a second polarizing plate 163 at each rear surface thereof. The polarizing plates 161 and 163 polarize natural light incident with vibration in several directions into one direction (that is, polarization).

As shown in FIG. 2, when a signal is not applied to the viewing angle control cell 200, light is incident on a front surface of the LCD panel since the white pigments 221a are entirely distributed at the sheet layer 221. Accordingly, a wide viewing angle mode is implemented.

As shown in FIG. 3, when a signal is applied to the viewing angle control cell 200, a voltage is applied to the first electrode 213 and the second electrode 217, thereby forming an electric field therebetween. Accordingly, the white pigments 221a are densely arranged near the electrodes by an electrophoretic characteristic.

By a density difference between the pigments, a refractive index of the pigment becomes different from a peripheral refractive index. Accordingly, when the white pigments 221a are used in the viewing angle control cell, light incident with an inclined angle is reflected, thereby enhancing a linear characteristic of light.

Figure 4:
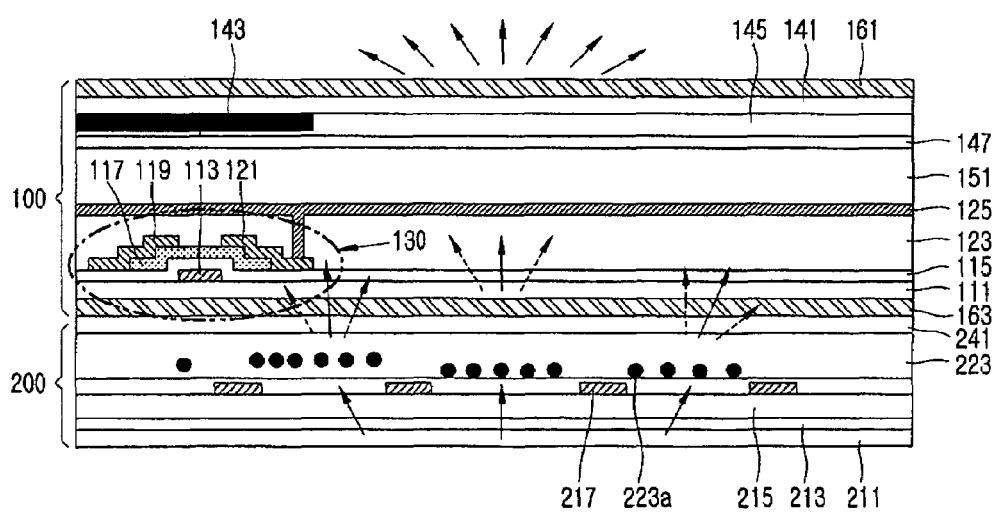
FIG. 4 a sectional view showing an LCD device for implementing a wide viewing angle when a signal is not applied to a viewing angle control cell using black pigments in an LCD device for switching between a wide viewing angle display mode and a narrow viewing angle display mode according to a second exemplary embodiment of the present invention.
Figure 5:
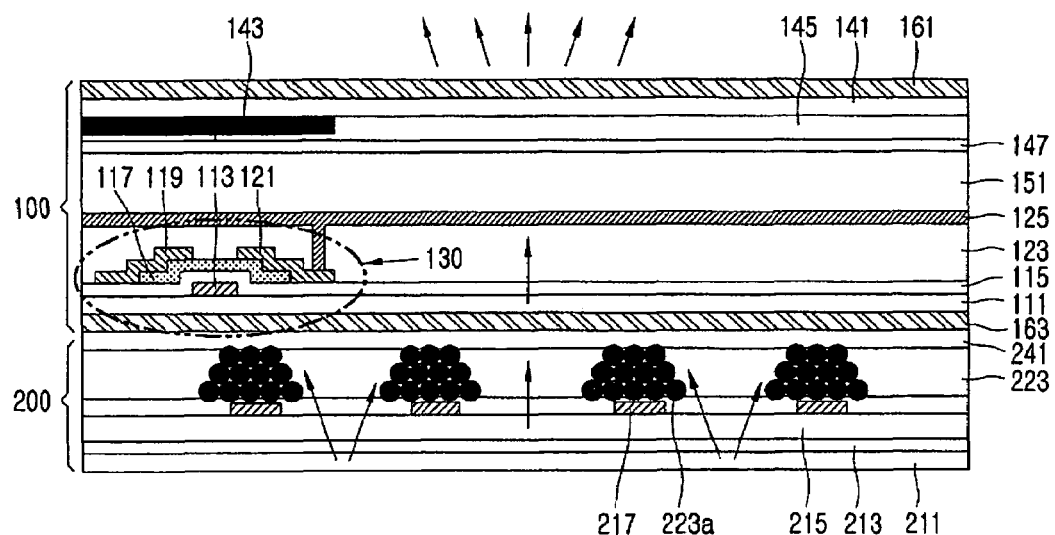
FIG. 5 is a sectional view showing an LCD device for implementing a narrow viewing angle when a signal is applied to a viewing angle control cell using black pigments in the LCD device for switching between a wide viewing angle display mode and a narrow viewing angle display mode according to the second embodiment of the present invention.

FIGS. 4 and 5 are sectional views showing an LCD device for implementing a wide viewing angle when a signal is not applied to a viewing angle control cell using black pigments in an LCD device for switching between a wide viewing angle display mode and a narrow viewing angle display mode according to a second exemplary embodiment of the present invention. As shown in FIG. 4, when a signal is not applied to the viewing angle control cell 200, light is incident to a front surface of the LCD panel since the black pigments 223a are entirely distributed at a sheet layer 223. Accordingly, a wide viewing angle mode is implemented. As shown in FIG. 5, when a signal is applied to the viewing angle control cell 200, a voltage is applied to the first electrode 213 and the second electrode 217, thereby forming an electric field therebetween. Accordingly, the black pigments 223a are densely arranged near the electrodes by an electrophoretic characteristic.

By a density difference between the black pigments, a refractive index of the black pigment becomes different from a peripheral refractive index, and light incident with an inclined angle is absorbed by the black pigments 223a. Accordingly, an inclined component of the incident light disappears to leave only a linear component of the incident light, thereby implementing a narrow viewing angle display mode.

Figure 6:
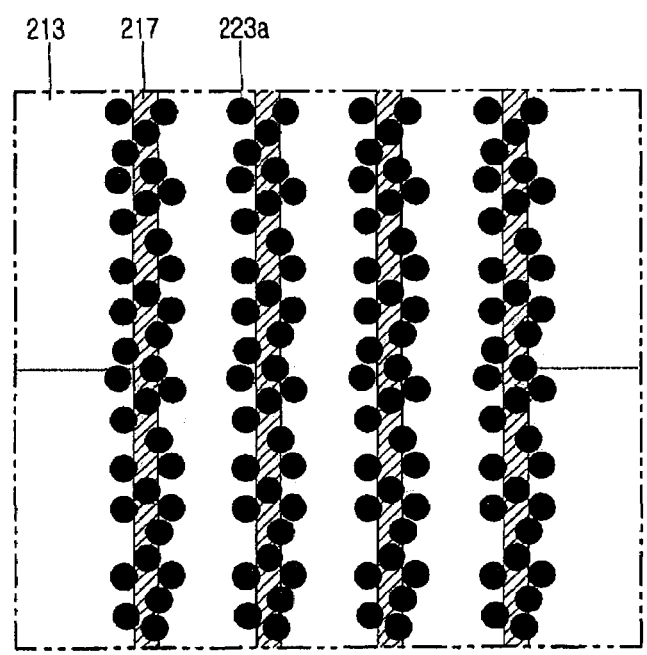
FIG. 6 is a view showing a structure for narrowing right and left inclined viewing angles using a longitudinal straight-type electrode in an LCD device for switching between a wide viewing angle display mode and a narrow viewing angle display mode according to another exemplary configuration of the present invention.

FIG. 6 is a view showing a structure for narrowing right and left inclined viewing angles using a longitudinal straight-type electrode in an LCD device for switching between a wide viewing angle display mode and a narrow viewing angle display mode according to another exemplary configuration of the present invention. That is, the second electrode 217 is arranged above the first electrode 213 as a longitudinal straight-type under a state that an insulating layer 215 (of FIGS. 2-5) is disposed therebetween, and black pigments are densely arranged on the second electrode 217, thereby narrowing right and left inclined angles.

Figure 7:
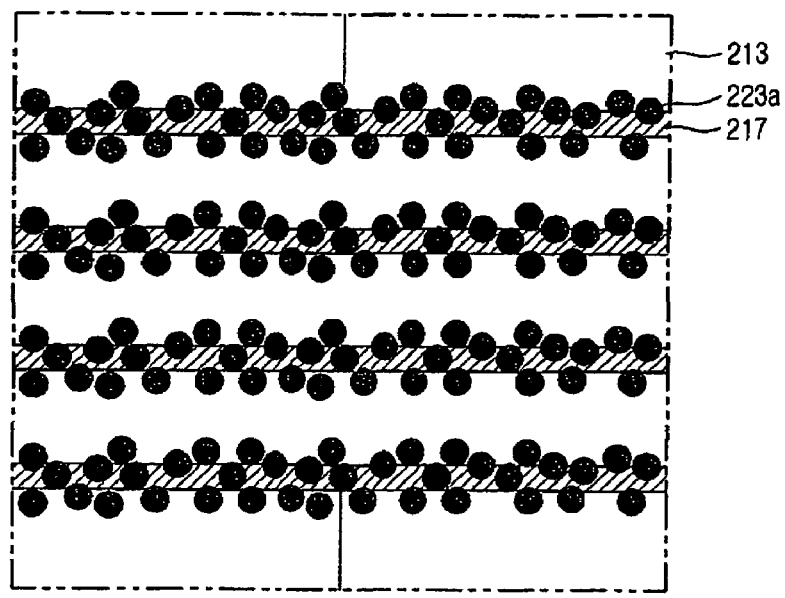
FIG. 7 is a view showing a structure for narrowing upper and lower inclined viewing angles using a horizontal straight-type electrode in the LCD device for switching between a wide viewing angle display mode and a narrow viewing angle display mode according to still another exemplary configuration of the present invention.

FIG. 7 is a view showing a structure for narrowing right and left inclined viewing angles using a horizontal straight-type electrode in an LCD device for switching between a wide viewing angle display mode and a narrow viewing angle display mode according to still another exemplary configuration of the present invention. That is, the second electrode 217 is arranged above the first electrode 213 as a horizontal straight-type under a state that an insulating layer 215 (of FIGS. 2-5) is disposed therebetween, and black pigments 223a are densely arranged on the second electrode 217, thereby narrowing upper and lower inclined angles.

Figure 8:
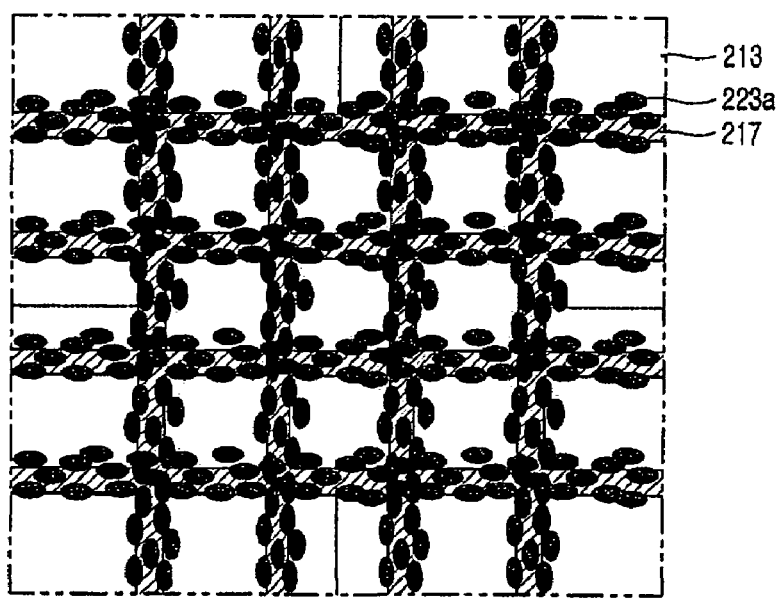
FIG. 8 is a view showing a structure for narrowing right, left, upper, and lower inclined viewing angles using a lattice type electrode in the LCD device for switching between a wide viewing angle display mode and a narrow viewing angle display mode according to yet another exemplary configuration of the present invention.

FIG. 8 is a view showing a structure for narrowing right and left inclined viewing angles using a lattice type electrode in an LCD device for switching between a wide viewing angle display mode and a narrow viewing angle display mode according to yet another exemplary configuration of the present invention. That is, the second electrode 217 is arranged above the first electrode 213 as a lattice type under a state that an insulating layer 215 (of FIGS. 2-5) is disposed therebetween, and black pigments 223a are densely arranged on the second electrode 217, thereby narrowing right, left, upper, and lower inclined angles.

As aforementioned, in accordance with the present invention, the viewing angle control cell having pigments is arranged at an upper surface or a lower surface of the LCD device, and an electrode has a structure for forming an electric field so that the pigments can move to the electrode direction at the time of converting a display mode into a narrow viewing angle mode. Although FIGS. 6-8 show the exemplary configurations using black pigments, white pigments can also be used without departing from the scope of the invention. Accordingly, the present invention can be applied to all kinds of modes of an LCD device. Furthermore, since a panel capable of controlling a wide viewing angle and a narrow viewing angle is provided in the present invention, the present invention can be applied to a middle size or small size LCD device.

It will be apparent to those skilled in the art that various modifications and variations can be made in the LCD device for switching between wide viewing angle display mode and narrow viewing angle display mode and method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device for switching between a wide viewing angle display mode and a narrow viewing angle display mode, comprising:
   an LCD panel including an array substrate, a color filter substrate, and a liquid crystal layer disposed between the array substrate and the color filter substrate; and
   a viewing angle control cell disposed adjacent to the LCD panel, the viewing angle control cell including first and second substrates, first and second electrodes disposed between the first and second substrates, an insulating layer disposed between the first and second electrodes, and a sheet layer having pigments disposed between the first and second substrates, wherein the first electrode is disposed on the first substrate, the insulating layer is disposed on the first substrate, the second electrode is disposed on the insulating layer, and wherein the sheet layer is disposed on the second substrate such that the sheet layer and the second electrode face each other with a gap therebetween.

2. The device of claim 1, wherein a distribution of the pigments in the sheet layer is changeable according to an electric field applied between the first and second substrates.

3. The device of claim 1, wherein the sheet layer having the pigments is disposed proximate to the second substrate.

4. The device of claim 1, wherein the second substrate contacts the LCD panel.

5. The device of claim 1, wherein a thin film transistor and a pixel electrode are formed on the array substrate.

6. The device of claim 1, wherein a polarizing plate is formed at each rear surface of the array substrate and the color filter substrate.

7. The device of claim 1, wherein the viewing angle control cell is disposed at one of an upper surface and a lower surface of the LCD panel.

8. The device of claim 1, wherein, when the viewing angle control cell is driven, a narrow viewing angle mode is implemented.

9. The device of claim 8, wherein, when the narrow viewing angle mode is implemented, the pigments are densely distributed proximate to the second electrode.

10. The device of claim 1, wherein the pigments are one of white pigments and black pigments.

11. The device of claim 1, wherein the second electrode includes one of a longitudinal straight electrode, a horizontal straight electrode, and a lattice shaped electrode.

12. A method for fabricating a liquid crystal display (LCD) device for switching between a wide viewing angle display mode and a narrow viewing angle display mode, comprising:
   forming an LCD panel including an array substrate, a color filter substrate, and a liquid crystal layer between the array substrate and the color filter substrate; and
   forming a viewing angle control cell disposed adjacent to the LCD panel, the viewing angle control cell including first and second substrates, first and second electrodes disposed between the first and second substrates, an insulating layer disposed between the first and second electrodes, and a sheet layer having pigments disposed between the first and second substrates, wherein the first electrode is formed on the first substrate, the insulating layer is formed on the first substrate, the second electrode is formed on the insulating layer, and wherein the sheet layer is formed on the second substrate such that the sheet layer and the second electrode face each other with a gap therebetween with the second substrate contacting the LCD panel.

13. The method of claim 12, further comprising forming a thin film transistor and a pixel electrode on the array substrate.

14. The method of claim 12, further comprising forming a polarizing plate at each rear surface of the array substrate and the color filter substrate.

15. The method of claim 12, wherein the viewing angle control cell is disposed at one of an upper surface and a lower surface of the LCD panel.

16. The method of claim 12, wherein the pigments are white pigments or black pigments.

17. The method of claim 12, wherein the second electrode includes one of a longitudinal straight electrode, a horizontal straight electrode, and a lattice shaped electrode.

18. The method of claim 12, wherein a distribution of the pigments in the sheet layer is changeable according to an electric field applied between the first and second substrates.

* * * * *